(12) United States Patent
Durak et al.

(10) Patent No.: US 11,856,094 B2
(45) Date of Patent: Dec. 26, 2023

(54) METHOD OF QUANTUM KEY DISTRIBUTION VIA LOAD NODE

(71) Applicant: OZYEGIN UNIVERSITESI, Istanbul (TR)

(72) Inventors: Kadir Durak, Istanbul (TR); Burak Kebapci, Istanbul (TR)

(73) Assignee: OZYEGIN UNIVERSITESI, Istanbul (TR)

( * ) Notice: Subject to any disclaimer, the term of this patent is extended or adjusted under 35 U.S.C. 154(b) by 435 days.

(21) Appl. No.: 17/418,279

(22) PCT Filed: Dec. 16, 2019

(86) PCT No.: PCT/TR2019/051081
§ 371 (c)(1),
(2) Date: Jun. 25, 2021

(87) PCT Pub. No.: WO2020/142033
PCT Pub. Date: Jul. 9, 2020

(65) Prior Publication Data
US 2022/0123928 A1    Apr. 21, 2022

(30) Foreign Application Priority Data

Dec. 31, 2018   (TR) .................................. 2018/21269

(51) Int. Cl.
*H04L 9/08* (2006.01)
*G06N 10/60* (2022.01)
*G06N 10/70* (2022.01)
*H04B 10/70* (2013.01)

(52) U.S. Cl.
CPC ........... *H04L 9/0855* (2013.01); *G06N 10/60* (2022.01); *G06N 10/70* (2022.01); *H04B 10/70* (2013.01)

(58) Field of Classification Search
CPC ...... H04L 9/0855; G06N 10/60; G06N 10/70; H04B 10/70; H04B 10/1129
See application file for complete search history.

(56) References Cited

U.S. PATENT DOCUMENTS

2013/0208894 A1*   8/2013   Bovino ................. H04L 9/0852
                                                    380/278

FOREIGN PATENT DOCUMENTS

CN            206807465 U   * 12/2017

* cited by examiner

*Primary Examiner* — Philip J Chea
*Assistant Examiner* — Sangseok Park
(74) *Attorney, Agent, or Firm* — Bayramoglu Law Offices LLC

(57) ABSTRACT

A method for a quantum key distribution from a first target node to a second target node across a network via an entanglement-based protocol, including the following steps: transferring entangled particles from a load node to the first target node and to at least one intermediate node; generating a quantum key with the entangled particles transferred to the first target node and the at least one intermediate node; transmitting the quantum key to the second target node on a first path located on the network with a stage of secure quantum key transmission agreement starting from the at least one intermediate node by encrypting intervals of binary nodes with pre-shared quantum keys; and providing a secure communication with the quantum keys between the first target node and the second target node on a second path located on the network.

20 Claims, 1 Drawing Sheet

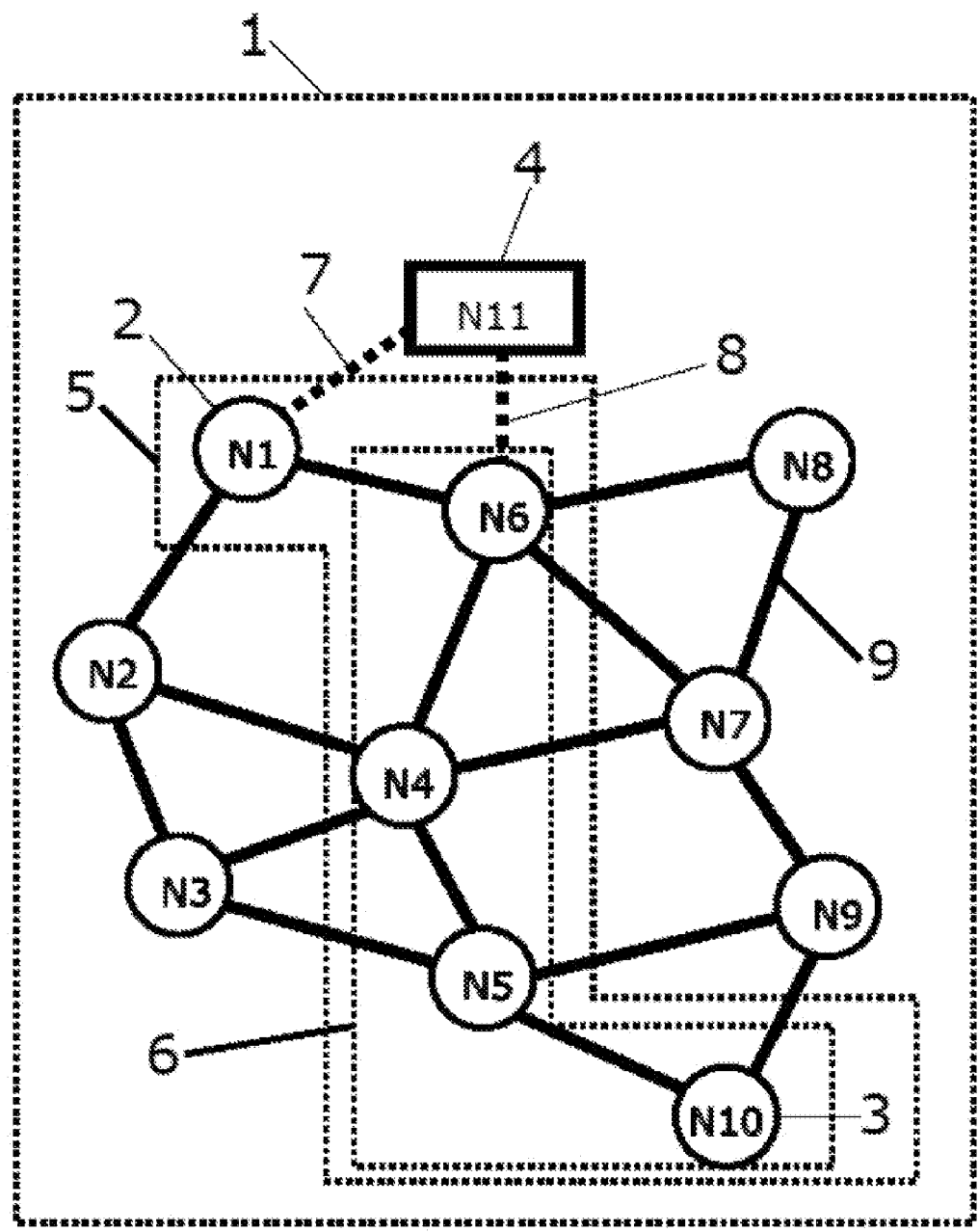

METHOD OF QUANTUM KEY DISTRIBUTION VIA LOAD NODE

CROSS REFERENCE TO THE RELATED APPLICATIONS

This application is the national phase entry of International Application No. PCT/TR2019/051081, filed on Dec. 16, 2019, which is based upon and claims priority to Turkish Patent Application No. 2018/21269, filed on Dec. 31, 2018, the entire contents of which are incorporated herein by reference.

TECHNICAL FIELD

The present invention relates to a method of quantum key distribution. More particularly, the present invention relates to a quantum key distribution method using an entanglement-based protocol via a load node.

SUMMARY

Quantum cryptography is a science of encryption that uses the laws of quantum mechanics to encrypt the message to be transmitted. It basically focuses on the transmission of the quantum key to be used for encrypting the message rather than transmitting the message. Therefore, using an extremely secure quantum key distribution method in quantum cryptography is very important.

The concept known as entanglement is used in quantum key distribution methods to fully guarantee the security. Entanglement allows two particles to be interrelated in quantum mechanics even if they are in physically different places. Although it is not possible to know exactly the specific conditions of both particles, it is possible to obtain some information about one particle from the calculations made for the other particle. However, since the condition of each particle is random until it is calculated, it is not possible to use this phenomenon in the data transmission. However, it can be ensured that a message is encrypted by the receiver and the transmitter performing calculations for a certain number of entangled particles and then comparing the results between themselves. A quantum key is formed with the data obtained in these calculations to share the confidential messages.

On the other hand, the entangled photons used in the quantum key distribution method can travel on optical lines only up to a certain distance without loss of transmission. Although there are experiments successful in transmitting entangled photons using large telescopes to distances of about 100 km, this distance is limited to only a few kilometers in networks based on commercially available optical fibers.

The problem of distance exists in optical fiber networks as well as in networks based on free space optical connections. Free space optical connections also cause direct line of sight problems due to the shape of the Earth. Although the direct line of sight problem is attempted to be overcome by elevated nodes, this solution is not sufficient due to the loss of transmission across the atmosphere.

On the other hand, satellites are among the devices that have been tried to extend the distance of the quantum key distribution. Where satellites are used, optical ground stations have been identified as secure quantum nodes. But, in this method, it is not possible, under existing conditions, to send quantum keys to a certain location in the world where there is no optical ground station. Various problems are encountered also in the transmission of the quantum conditions from the satellites outside the atmosphere.

When the known state of art is reviewed, it can be seen in the current studies that passive optical arrangements which create high difficulties in the application are presented as a solution to the problem of distance. Furthermore, other solution suggestions have focused on the security of the quantum key transmission ignoring the problem of loss of transmission.

As a result, considering the literature in the art, there is a need for cost-effective and proven efficient methods for such situations encountered with the increasing distance such as free space and fiber-based optical connections remaining at limited distances, the problem of direct line of sight in free space optical connections and the secure transfer of quantum keys to distant targets outside the connection range.

BRIEF DESCRIPTION OF THE DRAWINGS

FIGURE shows the quantum distribution network (1) in an embodiment of the present invention. In this embodiment, the first target node (N1), intermediate node (N6), nine secure nodes (N2-N9), second target node (N10) and load node (N11) are present. The figure also shows the network path (5) from the first target node (N1) to the second target node (N10), the network path (6) to which the secure key agreement is applied from the intermediate node (N6) to the second target node (N10), the optical connections (7, 8) made by the load node (N11) with the first target node (N1) and the intermediate node (N6), and finally the quantum communication channels (9).

DETAILED DESCRIPTION OF THE EMBODIMENTS

The present invention provides a quantum key distribution method applied with the entanglement-based protocols as a solution to the technical problems encountered as a result of increasing distance. Said method is intended to provide secure communication across a network (1) from the first target node (N1-N10) to the second target node (N1-N10) by overcoming the distance problem.

As used herein, the term "network" is a communication system that includes nodes as well as channels connecting them. The network enables the transmission of quantum information.

As used herein, the terms "first target node" and "second target node" are used to refer to terminals for secure communication in between. The first target node (N1-N10) and the second target node (N1-N10) can be separately determined from any node (N1-N10) contained in the network (1), provided that there is at least one intermediate node between them. Here, the first target node or the second target node may be any of the nodes (N1 to N10) shown in the FIGURE. Therefore, they are designated as (N1-N10).

As used herein, the term "intermediate node" is used to refer to the terminals involved in the distribution of the quantum key between target nodes.

As used herein, the term "quantum entanglement" means that a condition on one of a pair of subatomic particles affects the other at the same time independently of the distance between them. Also, the term "entangled particles" is used for these particles which may interfere with each other, The method of the present invention further comprises the following steps:

(e) transfer of entangled particles from the load node (N11) to the first target node (N1-N10) and to at least one intermediate node;

(f) generation of the quantum keys by the first target node (N1-N10) and at least one intermediate node by calculating and analyzing the entangled particles transferred;

(g) transmission of the quantum key to the second target node (N1-N10) on a path (6) located on the network with the stage of secure quantum key transmission agreement starting from at least one intermediate node; and (h) provision of the secure communication with the quantum key between the first target node (N1-N10) and the second target node (N1-N10) on a path (5) located on the network.

As used herein, the term "load node" is a mobile node and acts as the source node providing entangled particles carrying data via qubit (photon). In other words, here, the load node does not carry the quantum key, but carries the entangled particles that will form quantum keys.

In a preferred embodiment of the present invention, said load node (N11) establishes connections (7, 8) so as to form optical wireless communication with the first target node (N1-N10) and the intermediate node. Since the source node providing the entangled particles as data is mobile, thus any node (N1-N10) on the network (1) can easily reach the direct line of sight distance, good results have been obtained in overcoming the problems resulting from the length of the distance. In another aspect, the establishment of said connections (7, 8) is necessary in the process of distribution of the secure quantum key. As a result, the establishment of these connections (7, 8) by using the method of the present invention both solves the distance problem and enables the perfect performance of the secure quantum key distribution due to the distance problem. In addition to this, it is a preferred application for the present invention to establish said connections (7, 8) simultaneously. In this context, in another embodiment of the present invention, said optical wireless communication is preferably a free space optical communication.

The load node (N11) and the second target node (N1-N10) are not in direct line of sight of each other in cases of communications over long distances. Thus, the solution provided by the inventor in the present invention is primarily to provide a connection between the load node (N11) and the first target node (N1-N10) and the intermediate node.

In an embodiment of the present invention, said intermediate node is located on the shortest path between the first target node (N1-N10) and the second target node (N1-N10) and is also the neighboring node of the first target node (N1-N10). Thus, the connection to be established between the load node (N11) and the intermediate node to provide transmission to the second target number N1-N10 is a preferred aspect for the present invention.

In an embodiment of the present invention, in situations where, alternatively, the load node (N11) cannot establish connection with the intermediate node, another intermediate node is determined with the same distance to the first target node (N1-N10) and it may be provided that the load node (N11) establishes communication with this subsequently determined intermediate node. Such a failure or the inhibition of the establishment of a connection prevents the transmission from stopping and the distribution of the quantum key is ensured.

In an embodiment of the present invention, when the connections (7, 8) are established between the load node and the first target node (N1-N10) and the intermediate node, the entangled particles are transmitted by the load node to these two nodes. The entangled particles transmitted are calculated and analyzed by the first target node (N1-N10) and an intermediate node to form a quantum key. Here, the entangled particles are calculated using the Bell inequality method available in the prior art. The "S" value in the Bell inequality is calculated and the reliability of the source of entangled particles is tested. Entanglement-based quantum key distribution can be divided into two parts: in the first part, the reliability of the source is measured as described above. If the test in the first part is successful, the second part is applied. In the second part, key sorting is done. Here, the first target node (N1-N10) and the intermediate node can measure the polarization in entangled particles with different axes. They form a quantum key through this measurement. The objective after this stage is to transmit the generated quantum key to the second target node (N1-N10).

A secure quantum key transmission agreement stage along a network path (6) used to securely transmit the generated quantum key to the second target node (N1-N10) is used in the method provided by the present invention. In said stage, the quantum key is transmitted from the intermediate node to the second target node (N1-N10) on a path (6) on the network.

In a preferred embodiment of the present invention, each node (N1-N10) in the network (1) comprises at least one "pre-shared quantum key" for the stage of secure quantum key transmission agreement. On a path (6) on the network, the intervals of the binary nodes are encrypted with the pre-shared keys and transmitted to another node. In a preferred embodiment, said pre-shared quantum key is randomly calculated. The randomness of the calculation is one of the factors that make the stage more secure.

In another preferred embodiment of the present invention, each node comprises pre-shared quantum keys as many as the number of nodes neighboring to it. In reference to FIGURE, for example, the node N4 appears to have 5 neighboring nodes (N2, N3, N5, N6, N7), so N4 will contain one pre-shared quantum key that it shares with each neighboring node. In other words, N4 has a total of 5 quantum keys. With this quantum keys, the neighboring nodes can make direct secure communications with each other. Another effect of using quantum keys is that the quantum communication channels (9) in the network (1) may be open to public. The quantum communication channels allow the communication of two neighboring nodes.

More specifically, the secure quantum key distribution stage includes the following steps starting from the intermediate node:

(iv) encryption of the quantum key by the node with the pre-shared quantum key it shares with the neighboring node to which it will transmit the quantum key, then transmission of the encrypted quantum key to the neighboring node;

(v) decryption of the encrypted quantum key by said neighboring node with the pre-shared quantum key shared with said node;

(vi) repetition of the steps (i) and (ii) until the quantum key is transmitted to the second target node (N1-N10).

As a result, it can be understood from the above steps that the secure transmission of the quantum key to the second target node (N1-N10) is ensured by the network regardless of how long the distance between the two target nodes.

With the method of the present invention, the quantum communication channels (9) said network (1) can be fiber-optic or free space optical communication.

In a preferred embodiment of the present invention, said channels (9) are fiber-optic. In this embodiment, it is necessary to integrate the quantum resources into said channels (9).

In another preferred embodiment of the present invention, said channels (9) are free space optics. In this embodiment, for communication, roof telescopes can be used in the nodes. For free space optical communication, the direct line of sight distance of neighboring nodes in the network (1) is at least 5 km and preferably at least 3 km.

In another preferred embodiment, all nodes in the network (1) provided by the present invention are secure nodes except for the load node (N11). As used herein, the term "secure node" means that it is guaranteed that a node will not share keys with the nodes other than designated nodes.

In a further preferred embodiment, said entanglement-based quantum key distribution protocol may be E91 or BBM92.

In another preferred embodiment, said load node is selected from the group consisting of drone, balloon, unmanned aerial vehicle (UAV) and satellite (especially cube satellite) and preferably the load node is a drone.

In another preferred embodiment, in case that the load node is a satellite, each of the first target node and the first intermediate node is an optical ground station.

What is claimed is:

1. A method for a quantum key distribution from a first target node to a second target node across a network via an entanglement-based protocol, wherein the method comprises the following steps:
   a) transferring entangled particles from a load node to the first target node and to at least one intermediate node, wherein the load node is a mobile node and acts as the source node providing entangled particles carrying data via quibit;
   b) generating a quantum key with the entangled particles transferred to the first target node and the at least one intermediate node;
   c) transmitting the quantum key to the second target node on a first path located on the network with a stage of secure quantum key transmission agreement starting from the at least one intermediate node by encrypting intervals of binary nodes with pre-shared quantum keys, wherein the binary nodes are nodes on the firsth path; and
   d) providing a secure communication with the quantum key between the first target node and the second target node on a second path located on the network.

2. The method according to claim 1, wherein the load node establishes simultaneous connections with the first target node and the at least one intermediate node.

3. The method according to claim 2, wherein the simultaneous connections are established so as to form an optical wireless communication.

4. The method according to claim 3, wherein the optical wireless communication is a free space optical communication.

5. The method according to claim 1, wherein quantum communication channels exist in the network and the quantum communication channels are fiber-optic or free space optical.

6. The method according to claim 5, wherein quantum sources are integrated into the quantum communication channels when the quantum communication channels are fiber-optic.

7. The method according to claim 5, wherein rooftop telescopes are used in the method when the quantum communication channels are free space optical.

8. The method according to claim 7, wherein a direct line of sight distance of neighboring nodes in the network is at most 5 km.

9. The method according to claim 1, wherein the at least one intermediate node is a neighboring node of the first target node and is located on the shortest path between the first target node and the second target node.

10. The method according to claim 1, wherein all nodes in the network are secure nodes except for the load node.

11. The method according to claim 1, wherein the entanglement-based protocol is E91 or BBM92.

12. The method according to claim 1, wherein the load node is selected from the group consisting of drone, balloon, unmanned aerial vehicle (UAV) and satellite.

13. The method according to claim 12, wherein the load node is a drone.

14. The method according to claim 1, wherein each node in the network comprises at least one pre-shared quantum key for the stage of the secure quantum key transmission agreement in the step c.

15. The method according to claim 14, wherein the at least one pre-shared quantum key is random.

16. The method according to claim 1, wherein each node in the network comprises a number of the pre-shared quantum keys as many as a number of nodes neighboring to each node.

17. The method according to claim 1, wherein neighboring nodes in the network make direct secure communications with each other.

18. The method according to claim 5, wherein the quantum communication channels in the network are open to public.

19. The method according to claim 1, wherein the step c comprises the following steps:
   encrypting the quantum key by one of the binary nodes with the pre-shared quantum keys to obtain an encrypted quantum key, wherein the one of the binary nodes shares with a neighboring node, then transmitting the encrypted quantum key from the one of the binary nodes to the neighboring node;
   ii) decrypting the encrypted quantum key by the neighboring node with the pre-shared quantum keys shared with the one of the binary nodes;
   iii) repeating the steps i and ii until the quantum key is transmitted to the second target node.

20. The method according to claim 2, wherein all nodes in the network are secure nodes except for the load node.

* * * * *